US006234028B1

(12) United States Patent
Schindler et al.

(10) Patent No.: US 6,234,028 B1
(45) Date of Patent: May 22, 2001

(54) APPARATUS AND PROCESS FOR TIGHTENING A SCREW CONNECTION

(75) Inventors: Albrecht Schindler, Aspach; Thomas Bader, Neuenstein; Thorsten Klepsch, Aspach; Guenter Wahl, Weissach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/999,452

(22) Filed: Dec. 29, 1997

(30) Foreign Application Priority Data

Feb. 26, 1997 (DE) ............................................. 197 07 589

(51) Int. Cl.[7] ...................................................... F16B 31/02
(52) U.S. Cl. ................................................................ 73/761
(58) Field of Search ........................ 73/761, 650, 862.06, 73/814; 395/115

(56) References Cited

U.S. PATENT DOCUMENTS 5,493,913 * 2/1996 Layer et al. ........................... 73/761
5,579,453 * 11/1996 Linderfelser et al. ............... 395/115

FOREIGN PATENT DOCUMENTS 38 37 942 A1 5/1990 (DE) .

* cited by examiner

*Primary Examiner*—Max Noori
*Assistant Examiner*—Jewel V. Thompson
(74) *Attorney, Agent, or Firm*—Michael J. Striker

(57) ABSTRACT

The apparatus for tightening or installing a screw connection includes a screwdriver device (20) having a drive motor (20*a*) and a screwdriver spindle (20*b*); a control device (30) for controlling a torque, rotation speed, rotation angle, rotation direction, advance and/or tightening time of the screwdriver spindle (20*b*) and an operating device (40) including an input and/or output device (40*a*) for selecting a predetermined tightening or screwing process program which is assembled in a modular manner from individual tightening or screwing process program steps and which is used by the control device (30) to control the screwdriver device. The input and/or output device (40*a*) includes a device for providing an input display (40*b*) having a multi-dimensional, advantageously two-dimensional, field (40*c*) with a plurality of predetermined distinct field locations (40*d*) and a device for associating the respective field locations with predetermined tightening or screwing process program steps.

11 Claims, 2 Drawing Sheets

APPARATUS AND PROCESS FOR TIGHTENING A SCREW CONNECTION

BACKGROUND OF THE INVENTION

The present invention relates to an apparatus and process for tightening, installing or screwing a screw connection and, more particularly, to an apparatus for tightening or screwing a screw connection comprising a screwdriver device including a drive motor and a screwdriver spindle, a control device for controlling a torque, rotation speed, rotation angle, rotation direction, advance and/or tightening time of the screwdriver spindle and an operating device which includes an input and/or output device for setting up a predetermined tightening process program which is assembled in a modular manner from individual tightening program steps and which is used by the control device to control the screwdriver device. It also relates to a process including at least two steps for tightening or screwing a screw connection using this apparatus.

A screwdriver device is already known from German Patent Document DE 38 37 942 A1, in which the tightening or screwing process is composed from an arbitrary combination of tightening or screwing process steps by an operator. The screwing steps are input by an input device into a program memory, arranged in sequence in a tightening or screwing process program and are processed one after the other by the screwdriver controller. Listing the program result in extensive screwing or tightening programs, which are not easily understandable because of the sequential arrangement of tightening steps, especially with program branching steps. Changes or additions to the tightening or screwing process programs can be subsequently performed only with great effort or expense.

SUMMARY OF THE INVENTION

It is an object of the present invention to provide an apparatus and process for tightening a screw connection of the above-described type, which does not have the above-described disadvantages.

This object, and others which will be made more apparent hereinafter, is attained in an apparatus for tightening a screw connection comprising a screwdriver device including a drive motor and a screwdriver spindle and a control device for controlling tightening parameters such as a torque, rotation speed, rotation angle, rotation direction, advance and/or tightening time of the screwdriver spindle and an operating device which has an input/output in each instance output device for setting up a predetermined tightening or screwing process program which is assembled modularly from individual tightening process program steps and which is used by the control device to control the screwdriver device.

According to the invention the input and/or output device includes means for providing an input display, for example on a display screen, having a multi-dimensional field with a plurality of predetermined distinct field locations and means for associating the field locations with respective predetermined screwing process program steps.

The apparatus and process according to the invention has the advantage that it is comparatively easy to provide the tightening process with a tightening or screwing process program stored in a program memory and to perform subsequent changes and additions to it. The operator can easily get a subsequent overview of the programmed tightening process.

Advantageous features and improvements of the apparatus and the process according to the invention are possible and some of these features and improvements are included in the dependent claims appended hereinbelow. It is particularly advantageous that to correlate field locations in the input display to auxiliary locations, e.g. for documentation of the tightening process or for output or read off of information during the program operation. During operation of the program by the control device the auxiliary locations are processed together with the screwing or tightening process steps.

BRIEF DESCRIPTION OF THE DRAWINGS

The objects, features and advantages of the present invention will now be illustrated in more detail by the following description of the preferred embodiments, reference being made to the accompanying figures in which.

DESCRIPTION OF THE PREFERRED EMBODIMENT

Figure 1:
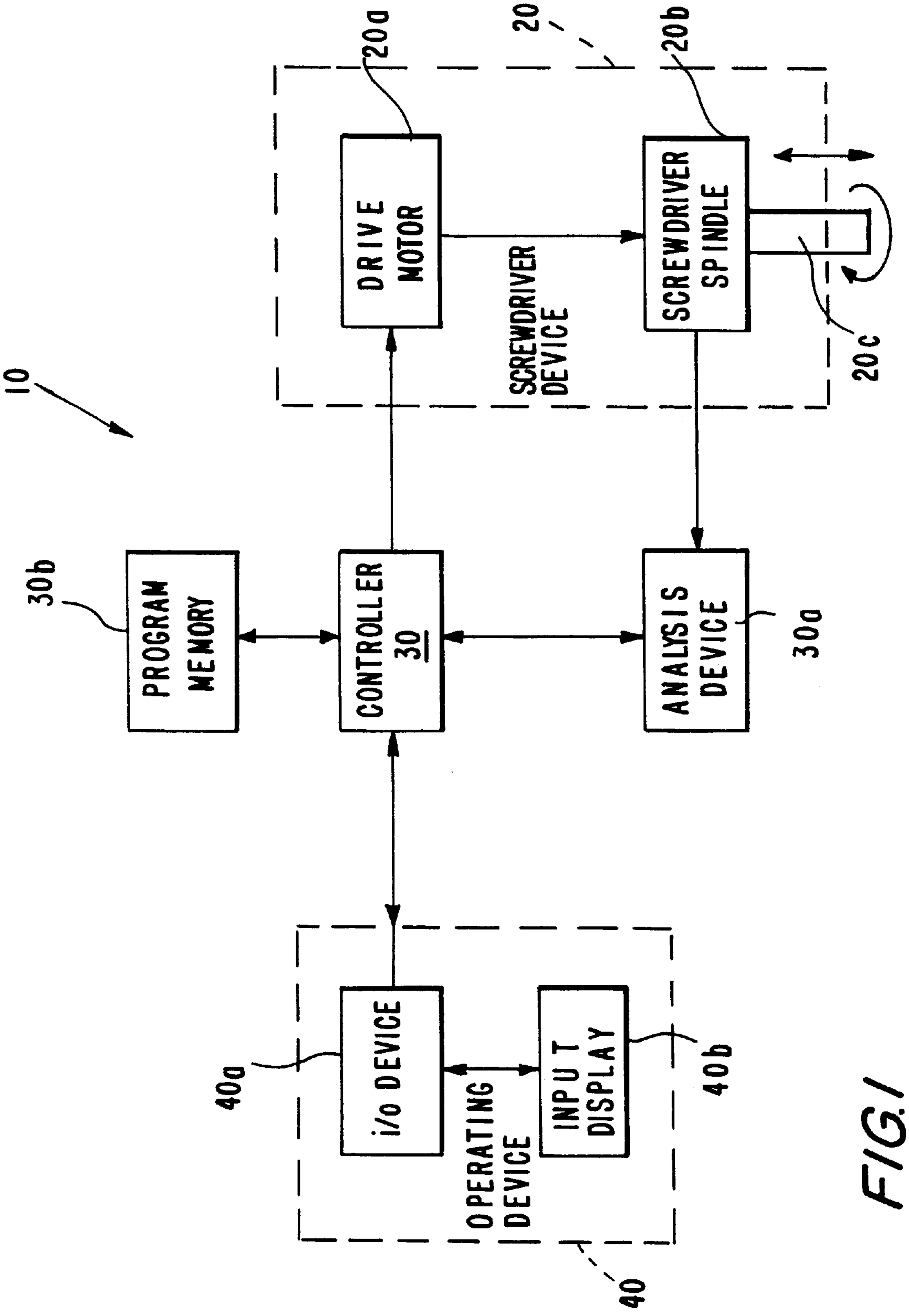
FIG. 1 is a block diagram of a screw driving or tightening apparatus according to the invention.

A screw driving or tightening apparatus 10 is schematically illustrated in FIG. 1. The tightening or screw driving apparatus 10 has a screwdriver device 20 including a drive motor **20*a* and a screwdriver spindle 20*b* for driving a screwdriver tool 20*c*. The screwdriver spindle 20*b* is driven by the drive motor 20*a* and can travel to a screw connection to be tightened together with the associated screwdriver tool 20*c* and can be put in it, and also can be taken out and withdrawn from it which is indicated by the double arrow in FIG. 1**.

The rotation direction, rotation speed, torque and advance of the screwdriver spindle **20*b* of the screwdriver device 20*a* can be controlled by a controller 30. Different tightening parameters, such as rotation direction, rotation speed, torque, rotation angle, advance and tightening time of the screwdriver spindle 20*a* are analyzed or evaluated in an analysis device 30*a* connected to the controller or control device 30. Suitable sensors or receivers are arranged in the screwdriver device 20 for this purpose. The actual or measured values received by the sensors are compared with the set values in the analysis device 30*a*, which are stored in a program memory 30*b* of the controller 30. The controller 30** guides the screwing process according to this comparison until at a standard end of it or interrupts it to begin a new screwing process or branches to another screwing process.

The controller 30 is coupled with an operating device 40. A desired screwing process program may be fed into the program memory **30*b* by means of the operating device 40. The operating device 40 includes an input/output in each instance output device 40*a* for input/output in each instance output of data, for example with a keyboard, display screen scanner, etc. by means of which the individual screwing steps 40*e* (FIG. 2) of the screwing process are input together with the associated screwing parameters. The input and/or output device 40*a* is provided with a display screen, by which the controller 30** can communicate with the operator of the tightening or screw driving apparatus, especially to give warnings, protocols for the screwing process, demand input, etc.

A screwing or tightening process can comprise several screwing or tightening steps. A plurality of screwing steps form a predetermined program sequence and/or a predetermined screwing process. Screwing steps are for example: engaging the screwdriver tool with the screw connection, screwing with a high rotation speed and a small torque, tightening with a low rotation speed and a large torque, withdrawing the screw spindle, etc. The screwing steps, which are stored in the program memory 30*b* of the controller 30, are defined in connection with respective parameter values according to the predetermined screwing process. A set value/actual value comparison of screwing parameters is provided in each screwing step, by means of which the maintaining of the predetermined screwing process is observed. Program branching to another program step in the program stored in the program memory occurs as needed according to the set value/actual value comparison, for example to a program stop, to a program step to be repeated or to a program step of another program sequence.

Because of the many different screw connections or screwing or tightening processes, for example tapping screw connections, yield limit tightening, etc., the screwing apparatus 10 should be able to be used for these different screwing or tightening processes. Different program sequences are given by the operator according to the program sequence, which are assembled from various screwing or tightening process program steps and can have different screwing parameters and/or parameter values, since these are read into the program memory 30*b* input by means of the input/output device 40*a*. The program steps, the associated screwing parameters and/or values are thus given in advance by the operator by means of the operating device 40.

Figure 2:
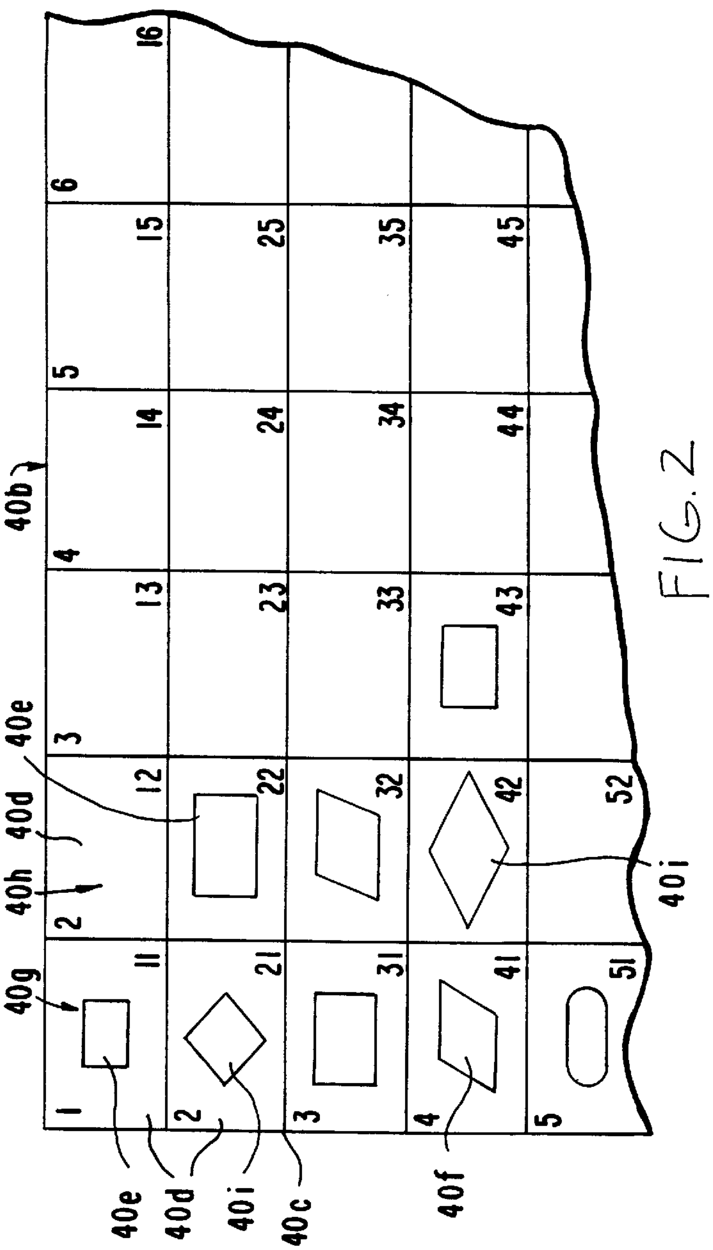
FIG. 2 is a diagrammatic illustration of an input display for setting up or selecting a particular screwing or tightening process.

The operating device 40 has the input/output device 40*a* with an input display 40*b* provided on a display screen device, as shown in FIG. 2. The input display 40*b* is in the form of a two-dimensional memory matrix, which has several columns and several rows. The matrix has clearly associated field locations which differ according to the row and column number. Each field location may be correlated with an arbitrary tightening or screwing step. This can occur for example when the operator provides the required input individually by means of a keyboard or, as shown in FIG. 2, enters only symbols in the field locations of the memory matrix, which represent tightening or screwing steps stored in the program memory.

The screwing or tightening process program steps in certain columns are performed one after the other during the screwing process. In the presence of certain screwing parameters or values branching from this program sequence to another program sequence with another column number is possible. Thus either the screwing process can continue in field location 31 or 22 according to the program steps in field location 21 for example in the exemplary case in FIG. 2. As the program steps in the field location 42 show, a branching to a field location with lower column number is possible. If no screwing steps are present in a field location, it jumps. It can then switch to a predetermined program step, for example a program halt.

Similarly also auxiliary steps can be provided like the program steps, which are associated with predetermined field location of the matrix and the auxiliary steps can be process for example in the program sequence: error or fault signals, output of protocols, read out of input. An example of an auxiliary step is given in field location 41, in which the output of a screw protocol is provided.

Figure 3:
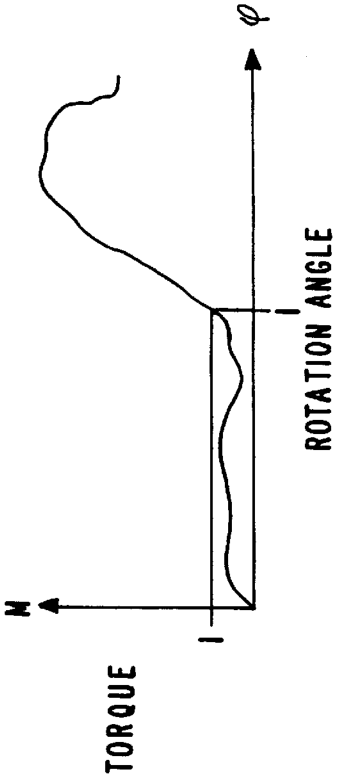
FIG. 3 is a graphical illustration of an individual tightening process according to the invention.

An additional possibility for data input is shown in FIG. 3. After that the screwing parameters and the associated comparison values can also be input in the form of graphical displays of the desired parameters for predetermined screwing processes. In FIG. 3 a certain screwing process is graphically illustrated which is characterized by the screwing parameters, torque M and rotation angle $\phi$. The input device 40*a* is formed so that the generation of the desired parameter statements for the screwing steps occurs in the program memory 30*b* by scanning input of graphical illustrations of parameter values of a screwing process grid or pattern.

The invention is not limited to the above-described embodiment. It is conceivable also to use a multi-dimensional memory matrix instead of a two-dimensional memory matrix. The individual steps of a program sequence can understandably also be correlated to predetermined lines. Branching to other lines would be possible. Also several screwdriver spindles can be controlled by means of one controller 30.

The disclosure of German Patent Application 197 07 589.4 of Feb. 26, 1997 is hereby explicitly incorporated by reference. This German Patent Application discloses the same invention as described hereinabove and claimed in the claims appended hereinbelow and is the basis for a claim of priority for the above-described instant invention under 35 U.S.C. 119.

While the invention has been illustrated and described as embodiment in an apparatus and process for tightening or screwing a screw connection, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An apparatus for tightening or installing a screw connection, said apparatus comprising a screwdriver device (20) including a drive motor (20*a*) and a screwdriver spindle (20*b*), said drive motor (20*a*) comprising means for driving the screwdriver spindle (20*b*);

a control device (30) for controlling the drive motor (20*a*);

an operating device (40) including an input/output device (40*a*), said input/output device (40*a*) including means for setting up a tightening or screwing process program, said tightening or screwing process program being assembled in a modular manner from individual tightening or screwing process program steps selected by said input/output device (40*a*), wherein the control device (30) includes means for controlling the drive motor according to said tightening or screwing process program;

wherein the input/output device (40*a*) includes means for generating an input display (40*b*) comprising a multi-dimensional field (40*c*), said multidimensional field comprising respective predetermined distinct field locations (40*d*), and means for associating corresponding ones of the individual tightening or screwing program steps with said respective predetermined field locations.

2. The apparatus as defined in claim 1, wherein said control device includes means for controlling at least one of a torque, rotation speed, rotation angle, rotation direction, advance and tightening time of the screwdriver spindle (20*b*).

3. The apparatus as defined in claim 1, wherein the input/output device is provided with a display screen for the input display (40*b*).

4. The apparatus as defined in claim 1, wherein said multidimensional field (40*c*) includes at least one auxiliary location (40*f*) for fault signals or output protocols of the tightening or screwing process and for ones of said field locations corresponding to said tightening or screwing process program steps associated with said fault signals or said output protocols.

5. The apparatus as defined in claim 1, further comprising means for assembling selected ones of said individual tightening or screwing program steps into a plurality of different screwing program step sequences (40*g*, 40*h*), each of said step sequences including at least one of said tightening or screwing program steps (40*e*).

6. The apparatus as defined in claim 5, wherein said tightening or screwing process program comprises at least two of said program step sequences and at least one program branch (40*i*) is provided in said tightening or screwing process program between said program step sequences (40*g*, 40*h*) according to a tightening or screwing process program parameter.

7. The apparatus as defined in claim 6, further comprising a two-dimensional memory matrix having a plurality of rows and columns and wherein said two-dimensional memory matrix comprises said multidimensional field.

8. The apparatus as defined in claim 7, wherein said tightening or screwing program steps (40*e*) of at least one of said tightening or screwing program step sequences (40*g*, 40*h*) are stored in said two-dimensional memory matrix in a predetermined column with successive ones of said program steps in respective locations in said predetermined column with increasing row number or are stored in said two dimensional memory matrix in a predetermined row with successive ones of said program steps in respective locations in said predetermined row with increasing column number.

9. The apparatus as defined in claim 4, wherein said input/output device (40*a*) includes means for reading in tightening or screwing process program parameters of a tightening or screwing process pattern established by graphic representation and means for associating respective ones of said tightening or screwing process program parameters with corresponding ones of said field locations (40*d*).

10. A process for tightening or installing a screw connection with an apparatus comprising a screwdriver device (20) including a drive motor (20*a*) and a screwdriver spindle (20*b*); a control device (30) for controlling the screwdriver spindle (20*b*); and an operating device (40) including an input/output device (40*a*) for setting up a tightening or screwing process program, which is assembled in a modular manner from individual tightening or screwing process program steps and which is used by the control device (30) to control the screwdriver device; wherein the input/output device (40*a*) includes means for providing an input display (40*b*) having a multidimensional field (40*c*), said multidimensional field comprising respective distinct field locations (40*d*), and means for associating said respective distinct field locations with corresponding ones of the tightening or screwing program steps; wherein said process includes the steps of:

a) providing a predetermined number of the individual tightening or screwing process program steps for the control device (30);

b) associating respective ones of said individual tightening or screwing process program steps with corresponding field locations (40*d*) of the multidimensional field (40*c*) of the input display (40*b*) by means of the input/output device (40*a*);

c) assembling the individual tightening or screwing process program steps arranged in the multidimensional field (40*c*) in different columns or rows of the field locations into different program step sequences with successive ones of said individual tightening or screwing process program steps in successive locations in said different columns or rows with increasing row or column number;

d) inputting at least one tightening or screwing process program parameter via the input/output device (40*a*) and correlating the at least one tightening or screwing process parameter with at least one program step of at least one of said program step sequences; and e) assembling said tightening or screwing process program from at least one of said program step sequences selected by means of said input/output device (40*a*); and f) performing said tightening or screwing process program assembled in step e) and branching between said program step sequences according to said at least one tightening or screwing process parameter, as needed.

11. The process as defined in claim 10, further comprising controlling the screwdriver spindle (20*b*) with the control device (30) according to at least one of a torque, rotation speed, rotation angle, rotation direction, advance and tightening time of the screwdriver spindle (20*b*).

* * * * *